United States Patent [19]

Ona et al.

[11] Patent Number: 4,557,887
[45] Date of Patent: Dec. 10, 1985

[54] METHOD FOR PRODUCING THIN SILICONE ELASTOMERIC FILMS

[75] Inventors: Isao Ona; Masaru Ozaki; Katsutoshi Usui, all of Chiba, Japan

[73] Assignee: Toray Silicone Company, Ltd., Tokyo, Japan

[21] Appl. No.: 504,646

[22] Filed: Jun. 15, 1983

[30] Foreign Application Priority Data

Jun. 16, 1982 [JP] Japan .................. 57-103426

[51] Int. Cl.$^4$ .............................................. B29D 7/02
[52] U.S. Cl. .................................... 264/216; 264/316; 264/331.11; 264/334; 428/220
[58] Field of Search ............................ 528/15, 31, 32; 264/331.11, 216, 316, 334; 428/220

[56] References Cited

U.S. PATENT DOCUMENTS

| | | | |
|---|---|---|---|
| 3,814,731 | 6/1974 | Nitzsche et al. ................ | 528/15 |
| 3,961,122 | 6/1976 | Gaines et al. ................... | 428/220 |
| 4,145,508 | 3/1979 | Bargain et al. .................. | 528/31 |
| 4,154,714 | 5/1979 | Hockemeyer et al. ........... | 528/15 |
| 4,162,356 | 7/1979 | Grenoble ......................... | 528/15 |
| 4,192,842 | 3/1980 | Kimura et al. .................. | 264/298 |
| 4,208,312 | 6/1980 | Okada et al. .................... | 528/15 |
| 4,248,750 | 2/1981 | Murakami et al. .............. | 528/15 |
| 4,374,891 | 2/1983 | Ward ................................ | 428/220 |
| 4,393,113 | 7/1983 | Sugie et al. ...................... | 428/220 |

*Primary Examiner*—James Lowe
*Attorney, Agent, or Firm*—R. H. Borrousch

[57] ABSTRACT

Silicone elastomeric films of 1 to 500 microns can be made by coating an addition-curable or dehydrocondensation-curable silicone elastomer composition on a coated paper which has a peeling resistance of no more than 50 g/cm, curing the composition, and then peeling the film from the coated paper. These thin silicone elastomeric films can be used for gas separation.

5 Claims, No Drawings

4,557,887

METHOD FOR PRODUCING THIN SILICONE ELASTOMERIC FILMS

BACKGROUND OF THE INVENTION

1. Field of the Invention

This invention relates to a method for producing a thin silicone elastomeric film. More specifically, this invention relates to a method for producing 1–500µ thick silicone elastomeric films comprising coating a fluid curable silicone elastomer composition on a coated paper, curing and then peeling the resulting thin silicone elastomeric film from the coated paper.

2. Description of the Prior Art

Silicone rubber thin films have recently been proposed for the concentration of a specific gas by utilizing their selective gas permeability and have also been proposed for use as thin film packing and gasket materials and as sealing tape due to their excellent properties such as resistance to heat, acid, water, and chemicals.

One to five millimeter thick silicone rubber films have conventionally been molded by the press-vulcanization of an organoperoxide-vulcanizable silicone rubber composition; however, this method suffers the following drawbacks: a large rubber film cannot be produced, a $\leq 500\mu$ thick film is technically difficult to produce, a uniformly thick film cannot be obtained, and the productivity is low.

SUMMARY OF THE INVENTION

Various methods were examined by the present inventors in order to eliminate the above-mentioned conventional drawbacks and a method for efficiently producing a uniformly thin 1–500µ silicone rubber film was discovered as a result.

This invention relates to a method for producing a thin silicone elastomeric film comprising coating an addition-curable or dehydrocondensation-curable fluid silicone elastomer composition on a coated paper which has a peeling resistance of the cured silicone elastomer from the coated paper surface of no more than 50 g/cm at 25° C. at a peeling rate of 30 cm/min and a peeling angle of 180°, curing the resulting coating of silicone elastomer composition which is on the coated paper, and thereafter peeling the resulting thin silicone elastomeric film from the coated paper to obtain a 1 to 500µ thick silicone elastomeric film.

DETAILED DESCRIPTION OF THE INVENTION

The coated paper is a glassine, kraft, or parchment paper which has been uniformly and smoothly coated with a synthetic resin or synthetic polymer. The paper may be anchor coated with poly(vinyl alcohol) or CMC as necessary. The coated surface of this coated paper exhibits a peeling resistance of 50 g/cm when the cured addition-curable or dehydrocondensation-curable fluid silicone elastomer composition is peeled from the coated surface at 25° C. at a peeling rate of 30 cm/min and a peeling angle of 180°. As long as, the coating exhibits the above-mentioned peelability, the coating to be used may be any type, a single coating or a mixture of two or more coatings, solid or liquid, or in the form of a liquid coated or adhered on a surface coated with a solid. However, when a liquid coating is employed, it tends to infiltrate into the paper and the additional use of a solid coating with a liquid coating is preferred.

Solid coatings which exhibit the above-mentioned peelability include triacetylcellulose, diacetylcellulose, poly(perfluoroalkyl methacrylate), poly(perfluoroalkyl acrylate), perfluoroalkyl methacrylate-perfluoroalkyl acrylate copolymers, perfluoroalkyl methacrylate-ethylene copolymers, and polytetrafluoroethylene wax.

Resins which exhibit the above-mentioned peelability or which can be used in a resin-liquid coating mixture or which can be used as the coating to be coated or adhered with a liquid release agent include nitrocellulose, polyethylene, polypropylene, ethylene-propylene copolymers, poly(ethylene terephthalate), polyamide, vinylidene chloride-vinyl chloride copolymers, vinylidene chloride-alkyl acrylate copolymers, ethylene-vinyl acetate copolymers, and alkyd resins. Liquid coatings include trifluoroethylene chloride low polymers, perfluoralkanoic acid esters, and perfluoroalkane oils.

The reason for specifying a peelability corresponding to a peeling resistance of 50 g/cm of the thin cured silicone elastomeric film ($\geq 1\mu$) from the coated paper's resin surface at 25° C. at a peeling rate of 30 cm/min and a peeling angle of 180° is as follows. At a lower thickness or higher peeling resistance that the above-mentioned values, the thin silicone elastomeric film is difficult to peel from the coated paper or the thin silicone elastomeric film will be injured by the forcible peeling. The thin silicone elastomeric film might be peeled without injury at an extremely slow rate of peeling; however, this reduces the productivity.

Addition-curable silicone elastomer compositions used in this invention are compositions which are cross-linked into an elastomer by the addition reaction of a functional group bonded to silicon in a polyorganosiloxane with a functional group bonded to a silicon in another polyorganosiloxane. A typical example is an addition-curable silicone elastomer composition which is principally composed of a polyorganosiloxane possessing an aliphatically unsaturated organic group such as vinyl, a polyorganohydrogensiloxane, and a platinum-group compound catalyst.

Typical examples of the polyorganosiloxane possessing an aliphatically unsaturated group such as vinyl are vinyldimethylsilyl-terminated polydimethylsiloxanes, vinyldimethylsilyl-terminated dimethylsiloxane-methylvinylsiloxane copolymers, and vinylmethylphenylsilyl-terminated dimethylsiloxane-methylphenylsiloxane copolymers.

Typical examples of the polyorganohydrogensiloxane are trimethylsilyl-terminated polymethylhydrogensiloxanes, trimethylsilyl-terminated dimethylsiloxane-methylhydrogensiloxane copolymers, dimethylsilyl-terminated dimethylsiloxane-methylhydrogensiloxane copolymers, and polymethylhydrogencyclosiloxanes.

Typical examples of the platinum-group compound catalyst are ultrafine platinum particles, chloroplatinic acid, platinum-olefin complexes, platinum-vinylsiloxane complexes, platinum-diketone complexes, palladium compound catalysts, and rhodium compound catalysts. A platinum compound catalyst is preferred from the standpoint of its activity.

Other examples of the addition-curable silicone elastomer composition are silicone elastomer compositions which can be cured by the addition reaction of a polyorganosiloxane possessing an aliphatically unsaturated group such as vinyl with a mercaptoalkyl group-containing polyorganosiloxane under ultraviolet irradiation and silicone elastomer compositions which can be cured by electron irradiation.

A dehydrocondensation-curable silicone elastomer composition is a composition which can be crosslinked into a elastomer by the dehydrogenation reaction of a functional group bonded to silicon in a polyorganosiloxane with a functional group bonded to silicon in another polyorganosiloxane. A typical example is a silicone elastomer composition which can be cured by dehydrocondensation and which is principally composed of a silanol-terminated polydiorganosiloxane, a polyorganohydrogensiloxane and a condensation reaction catalyst such as the heavy metal salt of an organic acid.

Typical examples of the silanol-terminated polyorganosiloxane are silanol-terminated polydimethylsiloxanes, silanol-terminated dimethylsiloxane-methylphenylsiloxane copolymers, and silanol-terminated polymethyl(3,3,3-trifluoropropyl)siloxanes. This siloxane may possess partially alkoxylated terminal hydroxyl groups which can inhibit the condensation reaction. Typical examples of the polyorganohydrogensiloxane crosslinking agent are hydrogendimethylsilyl-terminated dimethylsiloxane-methylhydrogensiloxane copolymers, trimethylsilyl-terminated polymethylhydrogensiloxanes, and polymethylhydrogencyclosiloxanes.

The addition-curable silicone elastomer composition is appropriately formed into a 1 to 500µ thick silicone elastomeric film while the dehydrocondensation-curable silicone elastomer composition is appropriately formed into 1 to 50µ thick and particularly 1 to 25µ thick silicone elastomeric films.

The fluid as specified in this text may be a solventless type, dispersion, or solution as long as it is in liquid form at room temperature. In the case of a solventless type, the viscosity of the polyorganosiloxane should be 0.005 m²/s at 25° C. In the case of a dispersion or solution, the polyorganosiloxane may be in the form of a gum or liquid.

The silicone elastomer, regardless of whether it is addition-curable or dehydrocondensation-curable, desirably contains a reinforcing inorganic filler such as dry-process silica, wet-process silica, or carbon black. Both addition-curable types and dehydrocondensation-curable types, and particularly addition-curable types, should contain a reaction inhibitor. In addition, heat stabilizers, pigments, organoalkoxysilanes, inorganic fibers, metal oxides, and calcium carbonate may be added.

The fluid curable silicone elastomer composition can be coated on a coated paper by the following method. The coated paper is first fixed in place and then coated with the fluid addition-curable or dehydrocondensation-curable silicone elastomer composition by reverse roll coating, wire-round bar coating, or air knife coating.

When the silicone elastomer composition is a dispersion or solution, it is cured after the organic solvent has been evaporated. When the silicone elastomer composition is a solventless type, it is cured immediately. The curing energy source should be appropriately selected according to the type of curable silicone elastomer composition.

When the curable silicone elastomer composition is principally composed of a polyorganosiloxane possessing an aliphatically unsaturated group such as the vinyl group, a polyorganohydrogensiloxane, and a platinum-group compound catalyst or when it is a dehydrocondensation-curable type, it should be cured by heating. Of course, the composition can be cured at room temperature if rapid curing is not necessary.

When the curable silicone elastomer composition is an ultraviolet-curable type, i.e., it is principally composed of a polyorganosiloxane possessing an aliphatically unsaturated group such as the vinyl group, a mercaptoalkyl group-containing organopolysiloxane, and a photosensitizer, it can be cured by ultraviolet irradiation. When the curable silicone elastomer composition is an electron beam-curable type, it can be cured by electron irradiation.

When the curable silicone elastomer composition coated on a coated paper is to be cured by heating, it may be blown with hot air, exposed to radiant energy, or allowed to stand under hot air. The method is selected as appropriate. However, the most efficient method is to pass the above-mentioned material continuously through a heating oven.

An addition-curable type can by passed through a heating oven at a temperature in the range of 100° to 180° C. for a residence time of 2 to 10 minutes (10 minutes at 100° C. or 2 minutes at 180° C.) while a dehydrocondensation-curable type should be passed through a heating oven at a temperature in the range of 100° to 180° C. for 4 to 15 minutes (15 minutes at 100° C. or 4 minutes at 180° C.). This procedure is preferred from the standpoint of producing a silicone elastomer lacking voids. For the production of a silicone elastomer lacking voids, the above-mentioned material is first passed through a relatively low temperature heating zone and then through a relatively high temperature heating zone.

In order to obtain the object thin silicone elastomer film, the curable silicone elastomer should be peeled from the coated paper after the curable silicone elastomer composition has been completely cured. At this point, the thin silicone elastomeric film and coated paper should be individually and continuously taken up from the standpoint of production efficiency. A 1 to 50µ silicone elastomer film is preferably sprayed with an ultrafine powder such as talc, ultrafine mica, titanium dioxide powder, zinc dioxide powder, or silica powder before it is taken up.

The method of this invention exhibits the following characteristics and advantages.

1. When a fluid curable silicone elastomer composition is coated on a coated paper which has been fixed in place and then cured, it does not suffer from thermal expansion like polytetrafluoroethylene or polyethylene films or from swelling with organic solvent like conventional films.

2. Because a coated paper is used, the surface of the thin cured silicone elastomeric film is very smooth.

3. Because coated paper to be employed exhibits a peeling resistance of $\leq 50$ g/cm at 25° C. of the cured silicone elastomeric film from the coated paper surface at a peeling rate of 30 cm/min and a peeling angle of 180°, it will not injure the thin cured silicone elastomeric film as it is peeled off, unlike paraffin-coated paper.

4. The fluid and particularly the fluid addition-curable silicone elastomer composition can be formed into a very thin film with a thickness ranging from 1 to 500µ and the fluid dehydrocondensation-curable silicone elastomer composition can be formed into an extremely thin film, e.g., 1 to 50µ. In both cases, a thin silicone elastomeric film without voids and with smooth surfaces can be efficiently produced.

A thin silicone elastomeric film which has been manufactured by the method of this invention can be employed in a broad range of applications such as a selectively permeable film for a specific gas or it may be stamped out into a film packing or gasket material or may be used as a tape-form sealing material.

This invention will be explained using demonstrational examples. "Parts" in the examples denotes "parts by weight". The viscosity and peeling resistance were both always measured at 25° C. The peeling resistance was the arithmetic mean for the peeling of 5 test pieces (width, 5 cm) at a peeling rate of 30 cm/min and at a peeling angle of 180°.

EXAMPLE 1

A glassine paper uniformly coated with triacetylcellulose(triacetylcellulose thickness, 10μ; glassine paper thickness, 210μ) was fixed on the tenter of a continuous production machine.

This coated paper was continuously coated using a knife coater (about 200μ thick) at a rate of 5 m/min with an addition-curable silicone elastomer composition dispersion (solids, 16 wt%; viscosity as measured by a rotary viscometer, rotor no. 4 at 12 rpm, 6.5 Pa·s) which was a toluene dispersion and solution of a dimethylsiloxane-methylvinylsiloxane copolymer gum, a trimethylsilyl-terminated polymethylhydrogensiloxane (viscosity, 0.00004 $m^2/s$), and a platinum catalyst as principal components, and a reinforcing silica filler.

The silicone elastomer composition was continuously blown with warm air at 40° C. to remove the toluene, cured by passage through a heating oven (length, 15 m) at 150° C. for a residence time of 3 minutes, cooled with cold air, and then sprayed with 200 mesh talc powder. The resulting thin silicone elastomeric film was peeled from the coated paper at a rate of 30 cm/min. At this point, the thin silicone elastomeric film and coated paper were individually taken up to different rolls while being peeled. The surface of the resulting thin silicone elastomeric thin showed no flaws, possessed no voids, and was uniformly cured. This thin silicone elastomeric film was 35μ thick.

The peeling resistance of the above-mentioned cured silicone elastomer from the coated paper was 2.6 g/cm.

For comparison examples, the manufacture of thin silicone elastomeric films was attempted by a method identical to that employed for the above-mentioned resin-coated paper with the exception that a polytetrafluoroethylene sheet (thickness, 200μ), poly(ethylene terephthalate) film, polyethylene film (thickness, 50μ), or paraffin-coated glassine paper was used instead of the above-mentioned coated paper.

Polytetrafluoroethylene sheet

When this film was introduced into the oven, it suffered sagging with the result that the thin cured silicone elastomeric film had a nonuniform thickness. Careful observation of the surface of the cured silicone elastomer revealed a large number of fine, longitudinal linear nonuniformities. The peeling resistance of the cured silicone elastomer from the polytetrafluoroethylene sheet was 2.5 g/cm.

Poly(ethylene terephthalate) film

When this film was introduced into the oven, it suffered sagging with the result that the cured silicone elastomer thin film had a nonuniform thickness. It was difficult to peel the thin silicone elastomeric film from the poly(ethylene terephthalate) film.

Polyethylene film

Waves appeared in the film of the silicone elastomer composition dispersion while drying under ambient atmosphere. When the material was in the oven, the film melted along the circumference. The thin silicone elastomeric film absolutely could not be peeled from the polyethylene film.

Paraffin-coated glassine paper

The thin silicone elastomeric film absolutely could not be peeled from the paraffin-coated glassine paper.

EXAMPLE 2

A coated paper composed of kraft paper uniformly coated with poly(perfluorooctyl methacrylate) [poly(perfluorooctyl methacrylate) thickness, 5μ; kraft paper thickness, 300μ] was fixed in a tenter.

This coated paper was coated (about 300 thickness) using an applicator with a solventless addition-curable silicone elastomer composition (viscosity as measured by a rotary viscometer, rotor no. 4 at 12 rpm, 22 Pa·s) which was composed of a vinyl-terminated polydimethylsiloxane (viscosity, 0.001 $m^2/s$), a trimethylsilyl-terminated polymethylhydrogensiloxane (viscosity, 0.00005 $m^2/s$), a platinum catalyst, and an addition-reaction inhibitor as principal components and a reinforcing silica filler. This was placed in a hot-air circulation oven at 110° C. for 10 minutes to cure the silicone elastomer composition and then removed from the oven and cooled to room temperature. The resulting thin silicone elastomeric film was peeled from the coated paper at a rate of 30 cm/min.

The thin silicone elastomeric film presented a smooth surface, no voids and uniform curing. The silicone elastomer layer was 310μ thick.

The peeling resistance of the above-mentioned cured silicone elastomer from the coated paper was 12 g/cm.

EXAMPLE 3

A thin silicone elastomeric film was manufactured by the method of Example 2 with the exception that the following glassine paper was used instead of the triacetylcellulose-coated glassine paper of Example 1. A solution of trifluoroethylene chloride low polymer (0.6 parts; viscosity, 0.0002 $m^2/s$) and nitrocellulose (2.5 parts) completely dissolved in acetone (50 parts) was uniformly sprayed on a glassine paper and the acetone was subsequently evaporated. The resulting thin silicone elastomeric film exhibited excellent properties similar to those in Example 2. The peeling resistance of the cured silicone elastomer from the glassine paper which had been sprayed with nitrocellulose containing trifluoroethylene chloride low polymer was 35 g/cm.

For a comparison example, the manufacture of a thin silicone elastomeric film was attempted by the method of Example 1 with the exception that the coated paper was manufactured by the method in which the above-mentioned trifluoroethylene chloride low polymer (9.4 parts) and nitrocellulose (2.5 parts) were completely dissolved in acetone (50 parts), the resulting solution was uniformly sprayed on glassine paper and the acetone was subsequently evaporated. When the thin silicone elastomeric film was peeled at 30 cm/min from the glassine paper coated with nitrocellulose containing trifluoroethylene chloride low polymer, its surface presented a number of fine depressions. However, the thin silicone elastomeric film was not damaged at a peeling rate of 10 cm/min.

The peeling resistance of the above-mentioned cured silicone elastomer from the glassine paper coated with nitrocellulose containing trifluoroethylene chloride low polymer was 55 g/cm.

EXAMPLE 4

A coated paper identical to the coated paper of Example 1 was fixed on the tenter of a continuous production machine. It was then continuously coated (100μ thick) using an applicator with a silicone composition (100 parts; solids, 15 wt%; viscosity as measured by a rotary viscometer, rotor no. 4 at 12 rpm, 8.8 Pa·s) containing a dibutyltin dilaurate catalyst (2 parts). This silicone composition was composed of a heat-treated mixture of silanol-terminated polydimethylsiloxane gum, reinforcing silica filler, hydrogendimethylsilyl-terminated dimethylsiloxane-methylhydrogensiloxane (viscosity, 0.00015 m$^2$/s) and acetic acid as the reaction inhibitor in a 1,1,1-trichloroethane solution-dispersion. This material was blown with warm air at 40° C. in order to remove the 1,1,1-trichloroethane and acetic acid reaction inhibitor and continuously passed through a heating oven at 100° C. at a residence time of 5 minutes and then at 130° C. at a residence time of 7 minutes. The completely cured silicone elastomer surface was sprayed with 300 mesh mica powder and the thin silicone elastomeric film was subsequently peeled from the coated paper at a rate of 30 cm/min. The thin silicone elastomeric film exhibited a smooth surface, the absence of any flaws and uniform curing. This thin silicone elastomeric film was 13μ thick.

The peeling resistance of the above-mentioned cured silicone elastomer from the coated paper was 42 g/cm.

That which is claimed is:

1. A method for producing a thin silicone elastomeric film comprising coating an addition-curable or dehydrocondensation-curable fluid silicone elastomer composition on a coated paper which has a peeling resistance of the cured silicone elastomer from the coated paper surface of no more than 50 g/cm at 25° C. at a peeling rate of 30 cm/min and a peeling angel of 180°, curing the resulting coating of silicone elastomer composition which is on the coated paper, and thereafter peeling the resulting thin silicone elastomeric film from the coated paper to obtain a 1 to 500μ thick silicone elastomeric film.

2. The method in accordance with claim 1 in which the coated paper is coated with an addition-curable silicone elastomer composition comprising a polyorganosiloxane possessing aliphatically unsaturated organic groups, polyorganohydrogensiloxane, and a platinum-group compound catalyst.

3. The method in accordance with claim 2 in which the composition is an organic solvent dispersion, the polyorganosiloxane is a vinyl terminated polydiorganosiloxane gum having dimethylsiloxane units and methylvinylsiloxane units, the polyorganohydrogensiloxane is a trimethylsilyl terminated polymethylhydrogensiloxane, and the platinum-group compound catalyst is a platinum compound.

4. The method in accordance with claim 3 in which the composition is continuously knife coated on triacetylcellulose coated glassine paper, warm air evaporates the organic solvent from the composition, and the resulting knife coated paper is heated to cure the composition to make the thin silicone elastomeric film which is peeled from the coated paper.

5. The method in accordance with claim 4 in which the thin silicone elastomeric film is sprayed with talc powder or mica powder as it is peeled from the coated paper.

* * * * *

UNITED STATES PATENT AND TRADEMARK OFFICE
CERTIFICATE OF CORRECTION

PATENT NO. : 4,557,887
DATED     : December 10, 1985
INVENTOR(S) : Isao Ona, Masaru Ozaki, and Katsutoshi Usui It is certified that error appears in the above-identified patent and that said Letters Patent is hereby corrected as shown below:

In Column 5, line 41; the words "elastomeric thin showed"
    should read "elastomeric film showed".

In Column 8, line 7; the word "angel" should read "angle".

Signed and Sealed this

Second Day of September 1986

[SEAL]

Attest:

DONALD J. QUIGG

Attesting Officer    Commissioner of Patents and Trademarks